(12) United States Patent
Choi

(10) Patent No.: US 6,278,883 B1
(45) Date of Patent: Aug. 21, 2001

(54) COMMUNICATION PROTOCOL FOR A WIRELESS DATA SYSTEM

(75) Inventor: Kwok Choi, Pleasanton, CA (US)

(73) Assignee: GWcom, Inc., Santa Clara, CA (US)

( * ) Notice: Subject to any disclaimer, the term of this patent is extended or adjusted under 35 U.S.C. 154(b) by 0 days.

(21) Appl. No.: 09/574,686

(22) Filed: May 17, 2000

Related U.S. Application Data

(62) Division of application No. 08/915,078, filed on Aug. 20, 1997.

(51) Int. Cl.[7] .................................................. H04Q 7/20
(52) U.S. Cl. ................... 455/552; 455/31.3; 455/444; 455/448; 455/466; 455/525; 370/477
(58) Field of Search ..................................... 455/403, 466, 455/422, 435, 500, 516–517, 524, 550, 557, 31.3, 449, 444, 448, 552, 553, 525; 370/310, 311, 338, 467, 477; 375/222

(56) References Cited

U.S. PATENT DOCUMENTS

| | | | |
|---|---|---|---|
| 5,579,374 | * 11/1996 | Doi et al. | 455/444 |
| 5,586,121 | * 12/1996 | Moura et al. | 370/404 |
| 5,594,731 | * 1/1997 | Reissner | 370/338 |
| 5,754,961 | * 5/1998 | Serizawa et al. | 455/517 |
| 5,802,469 | * 9/1998 | Nounin et al. | 455/422 |
| 5,898,904 | * 4/1999 | Wang | 455/31.3 |
| 5,920,815 | * 7/1999 | Akhavan | 455/426 |

* cited by examiner

*Primary Examiner*—Nay Maung
(74) *Attorney, Agent, or Firm*—Skjerven Morrill MacPherson LLP; Edward C. Kwok; Carmen C. Cook

(57) ABSTRACT

A wireless data network provides message control center broadcasting over a paging channel covering a wide service area and base stations distributed in said wide service area providing two-way communication over a local channel in local service areas within said wide service area. The wireless data network provides asymmetrical data transmission rates between the base station and subscriber wireless data terminals. In addition, the base stations and wireless data terminals can each transmit at different data rates according to desired range and to minimize probability of collision. In one embodiment, a registration procedure is provided to establish continuous communication between a wireless data terminal and a base station in the local channel.

10 Claims, 5 Drawing Sheets

COMMUNICATION PROTOCOL FOR A WIRELESS DATA SYSTEM

This application is a divisional of application Ser. No. 08/915,078, filed Aug. 20, 1997, entitled "Communication Protocol For A Wireless Data System" of Kwok Choi, now abandoned.

BACKGROUND OF THE INVENTION

1. Field of the Invention

The invention generally relates to wireless data communication; and in particular, the present invention relates to network access protocols used in wireless data communication.

2. Background of the Invention

Network access protocols exist for use in conjunction with a two-way wireless data network such as that shown in FIG. 1 and described in 759340 vldetail in and commonly assigned U.S. patent application Ser. No. 08/542,860, entitled "TWO-WAY WIRELESS DATA NETWORK", of Weijia Wang, now U.S. Pat. No. 5,898,904, issued on Apr. 27, 1999, which is incorporated herein by reference in its entirety.

As shown in FIG. 1, a wireless data network 100 includes a wireless data terminal 101, a cellularized base station 102, message control center 103, interfaces 105–109 to information and communication applications, and radio links 115 and 117. Message control center 103 has a high power transmitter capable of broadcasting through the paging channel to wireless data terminals within the entire service area of wireless data network 100. In this manner, wireless data network 100 is compatible with existing one-way paging services. Message control center 103 also communicates with base station 102 through radio link 117 which is a high power (e.g. 3 watts) transmission.

Base station 102 is one of a number of base stations that are distributed throughout the service area of wireless data network 100, each base station serving a relatively small portion of the service area of wireless data network 100 within its immediate vicinity. The local service area of a base station is sometimes called a cell. The base stations broadcast to wireless data terminals in their respective cells through a local channel. It is desired that the base stations cumulatively serve all locations within the service area of the wireless data network 100. Wireless data terminal 101 communicates with one or more of the base stations, for example base station 102, through link 115. Link 115 needs only provide a low power transmission (e.g. 100 mW) to cover a local area. At a location outside of the local service area of any base station, wireless data terminal 101 is restricted only to receiving messages from the 1-way paging channel. Other details of the operation of the two-way wireless data network can be found in the aforementioned copending patent application entitled "TWO-WAY WIRELESS DATA NETWORK" of Weijia Wang.

Base station 102 in wireless data network 100 uses a channel access protocol which allows all base stations within wireless network 100 to communicate with wireless data terminals over the same packet radio link at the same carrier frequency. An example of such an access protocol is disclosed in and commonly assigned U.S. patent application Ser. No. 08/542,770, entitled "WIRELESS NETWORK ACCESS SCHEME", of Weijia Wang et al., now U.S. Pat. No. 5,721,733, issued on Feb. 24, 1998, which is incorporated herein by reference in its entirety.

The network access protocol described in Weijia Wang et al. provides for high channel utilization rate under both the ALOHA protocol and the carrier sensing multi-access (CSMA) protocol by making use of the FM capture effect. However, the network access scheme in Weijia Wang et al. can be enhanced to increase the bandwidth and channel utilization of the two-way wireless data network described above without costly replacement of existing transceivers.

In these wireless networks, to initiate communication with a wireless data terminal, a wake-up signal is first sent from a message control center (e.g. message control center 103) to the wireless data terminal, before two-way communication is established between a local base station and the wireless data terminal. Because the high power transmitter of the message control center is a shared resource, under high message traffic conditions, an undesirable latency may be incurred. It would be desirable that, under certain conditions, the message control center can be bypassed in initiating local two-way communication, without at the same time surrendering the benefits described above.

Also, in wireless communication, to achieve a higher data rate, a transmitter is typically required to output a higher power. However, to achieve the mobility advantage of a wireless terminal, a wireless data terminal is typically powered by a battery, which must be provided with a reasonable service life-time between recharging operations. Thus, an increased data rate without a corresponding increase in the power requirement of the wireless data terminal is desired.

Other mechanisms for extending the wireless data terminal's limited service life-time between recharging are also desired.

SUMMARY OF THE INVENTION

According to the present invention, a network access protocol for a wireless data network is provided to increase the network bandwidth, improve transmission performance, and enhance mobility management.

In one embodiment, a two-way wireless data network of the present invention includes (a) wireless data terminals each capable of transmitting a radio signal of a local frequency over a predetermined range; and (b) one or more base stations having a radio signal transceiver, the base station serving a service area and capable of transmitting a radio signal of a second local frequency. The present invention provides a registration procedure whereby a wireless terminal can communicate, subsequent to the registration, with the base station within the predetermined range exclusively over the local frequencies. In that embodiment, each base station is required to transmit a data packet within a predetermined time interval. To achieve this goal, the base station can transmit a dummy data packet ("beacon"). A wireless data terminal checks periodically for such a data packet or beacon to determine if it is within the range of the base station. Upon detecting the beacon or the data packet, the wireless data terminal registers with the base station. To avoid an excessive number of registrations when a wireless terminal travels over the local service areas of a number of base stations, a "hysteresis" period is required after the wireless data terminal leaves the local service area of the base station it is registered with. During the hysteresis period, the wireless data terminal cannot register with another base station.

In one embodiment, the wireless data network includes a message control center broadcasting over a paging channel with a range covering the local service areas of the base stations within the wireless data network, thus providing in the paging channel a one-way messaging service to the wireless data terminals.

In one embodiment, the transmission rate used by the wireless data terminals is less than the transmission rate used by the base stations. In this wireless data network, an acknowledgment packet sent in respond to a data packet is transmitted at a different data rate from the data rate at which the data packet is sent. Thus, the network access protocol of the present invention conserves power for the wireless data terminals through the use of a dynamic data transmission rate.

According to another embodiment of the present invention, the base stations transmit at a higher power than the wireless data terminals, so that within the local service area of each base station there exist, with respect to the local channel, a two-way communication service area and a one-way communication service area outside of the two-way communication service area.

According to another aspect of the present invention, a data packet includes a first header and a second header. The first header includes a portion (e.g. 2 bits) of the full identification of the recipient, which is provided in the second header. Each wireless data terminal parses the first header to match that portion of the identification with a corresponding portion of its own identification. If the portions of identification do not match, no further processing of the remainder of the data packet occurs. Thus, the network access protocol of the present invention provide a data packet format which allows for rapid decoding and provides a forward compatibility capability.

In one embodiment of the present invention, when an acknowledgment packet is not received for a data packet sent, a retry scheme for delivery of the acknowledgment packet is provided. Under that scheme, the acknowledgment packet is redelivered using retransmissions at different data rates.

The network access protocol of the present invention supports an asymmetric coverage area pattern, thereby increasing the service coverage area of the local stations. The network access protocol supports both private local systems and public local systems operating within a wireless data network. The network access protocol of the present invention provides effective mobility management. A wireless data terminal can move seamlessly between service areas of different base stations while maintaining its session at all times.

The present invention is better understood upon consideration of the detailed description below and the accompanying drawings.

BRIEF DESCRIPTION OF THE DRAWINGS

In the present disclosure, like objects which appear in more than one figure are provided with like reference numerals.

DETAILED DESCRIPTION OF THE PREFERRED EMBODIMENTS

In wireless data network 100 of the prior art, a wireless data terminal camps on the paging channel for a wake-up message from a message control center. Upon receipt of such a wake-up message, the wireless data terminal switches to a local base station for two-way communication. (For ease of reference, in the remainder of this detailed description, the network access protocol of wireless data network 100 is referred to as "dual mode", which is incorporated as an operation mode under a protocol of the present invention). Thus, as mentioned above, a user may experience an undesirable latency. Under the present invention, a network access protocol is provided to allow a wireless data terminal to camp on a local base station for two-way communication. One network access protocol, which is implemented according to the present invention and referred below as the capture division packet access (CDPA) protocol, is described in this detailed description.

CDPA is particularly useful when a user's range of mobility is normally within the range of a local base station. One application which suits this mobility model can be found in a hospital. Many workers in a hospital (e.g. doctors and nurses), who move around the hospital constantly, are reached by messages throughout the work day. Since these messages typically are originated and received within the hospital itself, it would be more efficient that these messages bypass the message control center for the entire wireless data network, which serves a vast service area, and be directly sent and received by a local base station under control of a local message control center. Often, the entire hospital can be served by no more than one or two base stations. CDPA provides a special "local" mode optimized for use with this small number of base stations. The operations of these base stations under local mode form a "private" system within the local service area. Since it is also desirable that the wireless data terminal be able to operate outside the private system, the network access protocol of the present invention is designed to be compatible with operations in the service area outside of the private system, including operations under dual mode. To simplify the description below, the term "public" system is used to refer to the service area of the wireless data network outside of the private system. The designations "public" and "private" are merely provided to designate two operational modes of the network access protocol and does not necessarily correspond to actual ownership or management of these systems.

Figure 4A:
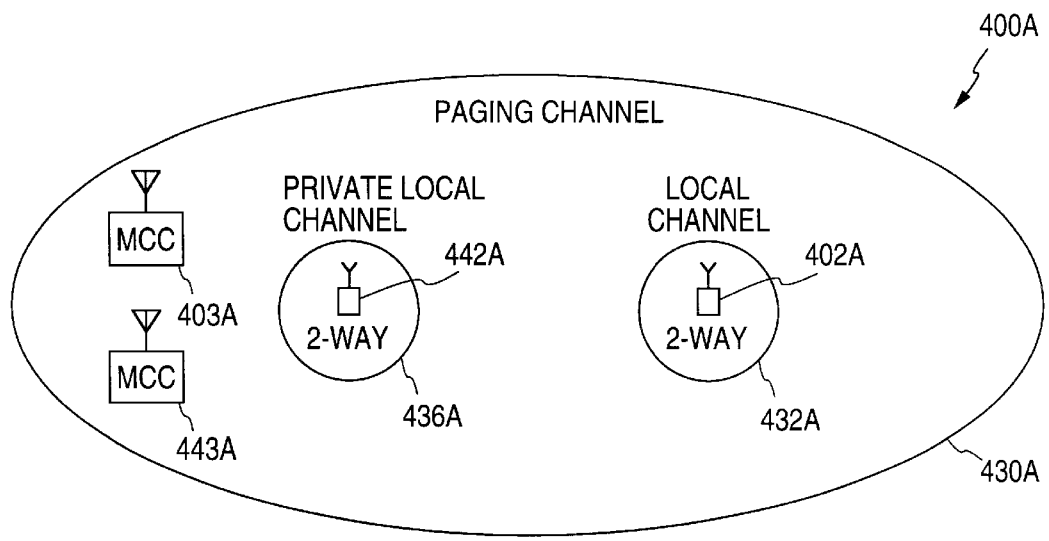
FIG. 4A illustrates, in service area 430A of a wireless data network 400A, private system 436A supporting a local override mode of a CDPA protocol, in accordance with the present invention.

A wireless data network 400A operating under CDPA is illustrated in FIG. 4A. As shown in FIG. 4A, wireless data network 400A includes a public system and a private system within a service area 430A. The service area of the private system is indicated by reference numeral 436A and is served at least in part by a base station 442A. (To simplify this detailed description, the private system is referred to by its service area as private system 436A). Private system 436A is controlled by a private message control center 443A and one or more base stations. The rest of wireless data network 400A includes areas served by the public system, e.g. service area 432A served by base station 402A. A wireless data network using CDPA can use one or more frequencies for communication between a base station and a wireless data terminal. If a single frequency is used, both the base station and the wireless data terminal compete for the channel. Under a two-frequency ("dual frequency") system, communication originating from the base station ("downlink") is assigned one frequency, and communication originating from a wireless data terminal ("uplink") is assigned the other frequency. In a dual frequency system, the wireless data terminals compete for the uplink. The wireless data network under CDPA can operate under either full duplex or half duplex mode. In a full duplex mode, the base station receives from the uplink and transmits to the downlink simultaneously. Under a half duplex mode, the base station transmits to the downlink when messages are not received in the uplink.

In private system 436A (FIG. 4A), which operates under CDPA's "local override" mode, a wireless data terminal registers with base station 442A, thereby selecting as a preferred communication method local 2-way communication with private base station 442A. Messages from the public system, including those broadcast by the public message control center on the paging channel, are relayed to the wireless data terminal by the private message control center. The public system can send these messages to the private message control center through either a wireless or a wired communication link. The registration procedure is described in further detail below. Additionally, if more than one base stations are provided within private system 436A, mobility management, which is described in further detail below, is provided by private message control center 443A. Otherwise, under the registration scheme described below, mobility management can be accomplished by message control center 403A for the entire service area 430A. In FIG. 4A, the public system is controlled by message control center 403A.

Under the local override mode, a wireless data terminal camps onto private base station 442A when it is within the service area of private system 436A. The wireless data terminal is assigned two programmable system identification codes, respectively identifying the public system and private system 436A. Every $T_{ld}$ time period (e.g., every 5 minutes), the wireless data terminal tunes into the local channel for a time period of $T_{ls}$ to monitor messages sent from the local base station (e.g. base station 442A in private system 436A). Thus, the local base station is required to send at least one data packet every $T_{ls}$ seconds. If a data packet is not available, the base station sends out a dummy data packet (i.e., a data packet including only header information and not a payload), called a "beacon", to identify itself. The data packet or beacon identifies for the wireless data terminal the base station in whose local service area the wireless data terminal is currently located. To enter local override mode, the wireless data terminal performs a local registration procedure with the local base station. Registration is performed by sending the base station a data packet, called a local registration request ("LRR"), and receiving from the base station a data packet acknowledging the LRR request. In the acknowledgment packet, the base station sets a "LOC" bit to indicate that subsequent communication is to be carried out under a local mode. Under a local mode, all data packets have their "LOC" bit set. Under dual mode, the LOC bit is not set, and the wireless data terminal camps only on the local channel for a fixed time period after sending a packet to the local base station, thereafter the wireless data terminal reverts to camping on the paging channel.

Subsequent to registration, if the wireless data terminal detects no traffic in the local channel for more than $H_c$ seconds, the wireless data terminal assumes that it has left the local service area of the base station with which it is registered. The wireless data terminal then switches to dual mode, camping on the paging channel. When the wireless data terminal receives a data packet or beacon identifying a base station different from the previous beacon, the wireless data terminal assumes that it has moved away from the local service area of the last base station and has moved into the local service area of the base station from which it receives the present data packet or beacon. The wireless data terminal can register with the new base station after a predetermined time period ("hysteresis"). Hysteresis is explained in further detail below.

Figure 1:
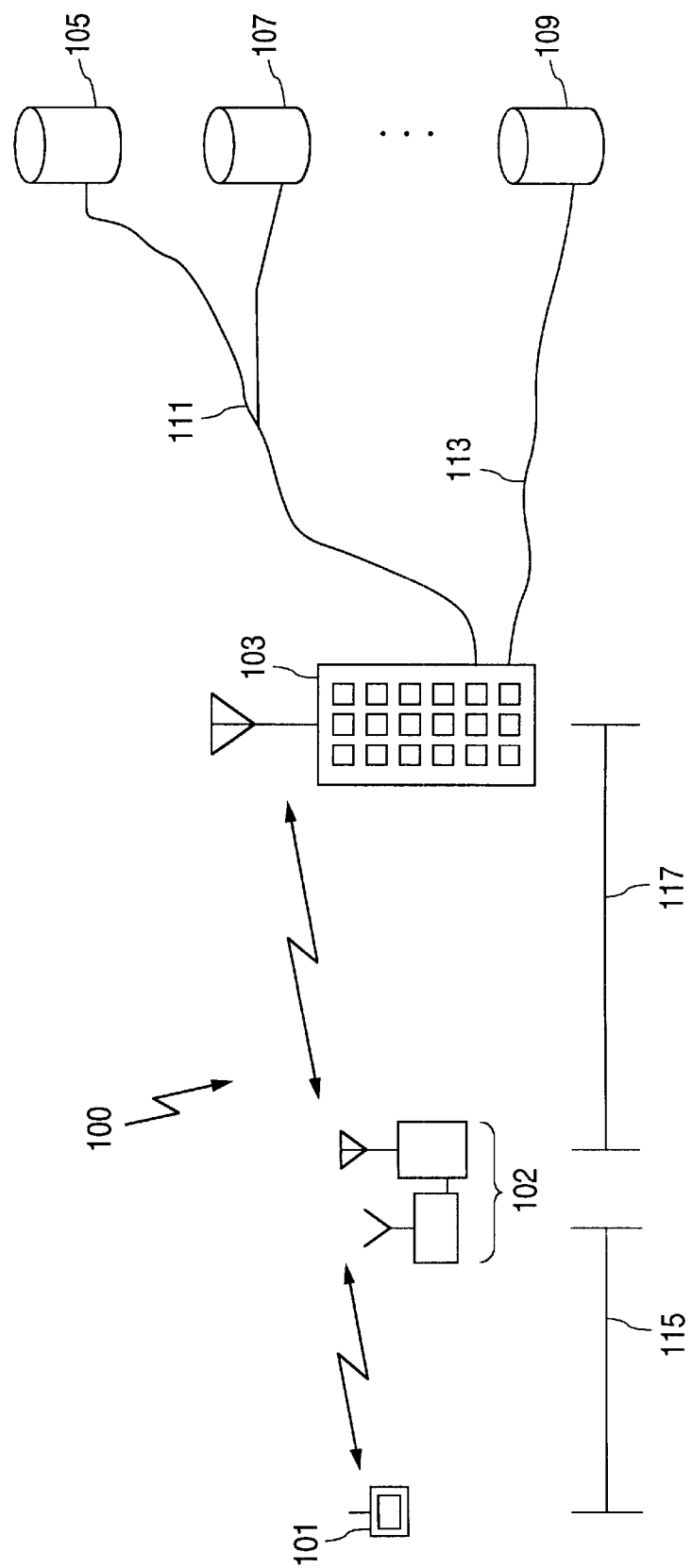
FIG. 1 illustrates a wireless data network 100 to which the present invention is applicable.
Figure 2:
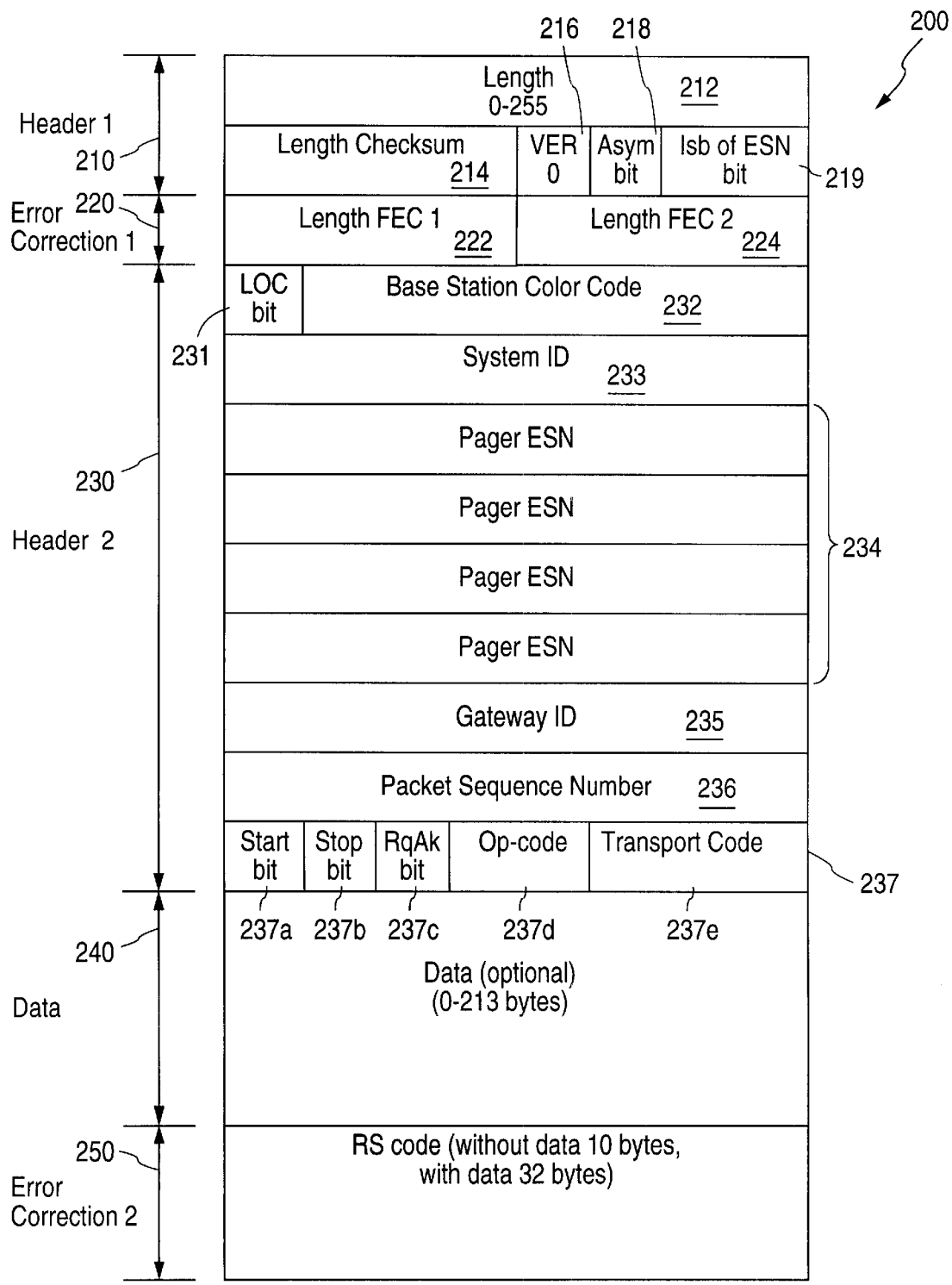
FIG. 2 shows the data fields of a data packet under the CDPA protocol of the present invention.

FIG. 2 shows the format of a data packet 200 used under the CDPA protocol of the present invention. As shown in FIG. 2, data packet 200 includes two header portions (210–220) and 230, an optional variable-length data payload 240, and an error correction portion 250. The first header portion consists of a two-byte first header 210 and a first error correction portion 220. Second header portion 230 and data payload 240 are protected as a Reed-Solomon code, providing error correcting portion 250.

First header 210 includes (i) a one-byte "length" field 212, indicating the number of bytes in the data packet following error correction portion 220, (ii) a 4-bit control field including a 1-bit "version number" 216, a 1-bit "ASYM control bit" field 218, and a 2-bit "ESN LSB ID" field 219, and (iii) a 4-bit "length checksum" field 214. ASYM control bit field 218 and the "ESN LSB ID" field 219 are explained in further detail below. The 4-bit length checksum is derived by summing with carry length field 212 and the 4-bit control field. First error correction portion 220 includes two 4-bit forward error correction (FEC) fields 222 and 224. Each of FEC fields 222 and 224 protects one data byte of first header 210.

Second header 230 includes (i) the 1-bit "LOC" field 231, referenced above, indicating a data packet sent under a local mode; (ii) a 7-bit "Base Station Color code" field 232, identifying the base station to which the packet relates; (iii) a 1-byte "system ID" field 233, identifying the wireless data network; (iv) a 4-byte "Pager ESN" field 234, uniquely identifying the wireless data terminal; (v) a 1-byte "gateway ID" field 235, which is a control byte identifying an application to which the packet relates; (vi) a 1-byte "packet sequence number field"; and (vii) a 1-byte control field consisting of start bit 237a, stop bit 237b and "request acknowledgment" (RqAk) bit 237c, a 2-bit opcode 237d, and a transport code 237e.

In data packet 200, the 2-bit ESN LSB field 219 includes the least significant 2 bits of the "PAGER ESN" field 234. By providing separately headers 210 and 230 and by including 2-bit ESN LSB field 219, a wireless data terminal can quickly determine if it is the intended recipient of a data packet. Specifically, while decoding first header portion 210, a wireless data terminal compares the least significant two bits of its pager identification with the two bits in the ESN LSB ID field 219 of the data packet being received. If these two bits do not match, further decoding, i.e., decoding of second header portion 230 is unnecessary. The wireless data terminal then resets itself and waits for the next data packet.

In one embodiment, the data processing circuitry is placed in a "sleep" mode when not processing a data packet. Thus, in that embodiment, power conservation is achieved by the 2-bit ESN LSB field 219, since the active time the wireless data terminal spent in decoding a data packet not destined for it is minimized.

Data packet 200 has a built-in forward compatibility capability. This forward compatibility capability is provided by version number field 216 in first header portion 210, which stores a version number of the data packet. The version number field 216 indicates the format of the rest of the data packet. Thus, a future upgrade of the data packet format can be achieved, in this instance, by setting version number field 216 to indicate to the wireless data terminal the new data format. Of course, in another embodiment, the width of version number field 216 is greater than 1-bit to ensure compatibility of more than one version of format upgrade.

Because a radio frequency signal's range is dependent upon its power (i.e., a longer range is achievable only by higher power), consideration must be given to power conservation when designing a range for a wireless data terminal. Power conservation is a secondary consideration, if at all, in the design for a base station. Thus, the possibility of an asymmetric downlink and uplink coverage area pattern exists. Use of asymmetric coverage areas can be advantageous for certain applications. For example, an asymmetric coverage pattern can be used in the start-up phase of a new system, when not all locations of the service area can be served by at least one base station. In that situation, some messages can be sent by the base stations to the wireless data terminals directly to alleviate the congestion in the paging channel. An asymmetric coverage pattern is described generally with reference to FIG. 3, and specifically to a CDPA wireless data network with reference to FIG. 4B.

Figure 3:
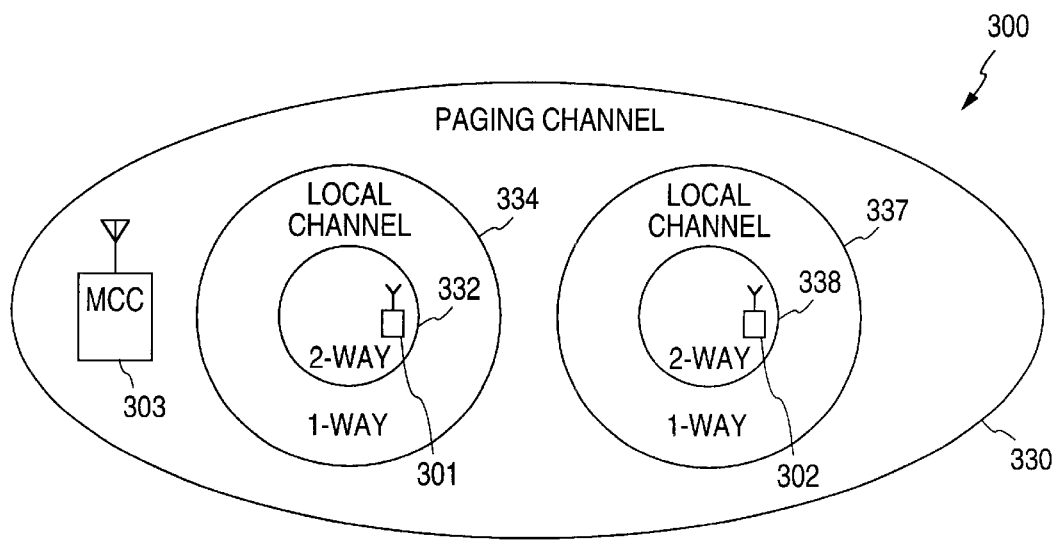
FIG. 3 illustrates the use of asymmetric area coverage to minimize congestion in the paging channel.

As shown in FIG. 3, wireless data network 300 includes two base stations 301 and 302, and a service area 330 served by a paging channel broadcast by a high power transmitter of message control center 303. Each of base stations 301 and 302 is provided an asymmetric coverage in the local channel. For example, in base station 301, the range of the downlink (i.e., the area within which base station 301 can transmit a message), which is indicated by reference numeral 334, is larger than the range of the uplink (i.e., the area in which a typical wireless data terminal can successfully send a message to the base station), which is indicated by reference numeral 332. A larger downlink coverage area is achieved by using a transmitter at base station 301 which is higher power than the transmitter of a mobile wireless data terminal. Thus, within uplink range 332, two-way communication between base station 301 and a wireless data terminal is possible. Outside of uplink range 332 but within downlink range 334, messages can be sent by base station 301 to a wireless data terminal using the local channel.

Figure 4B:
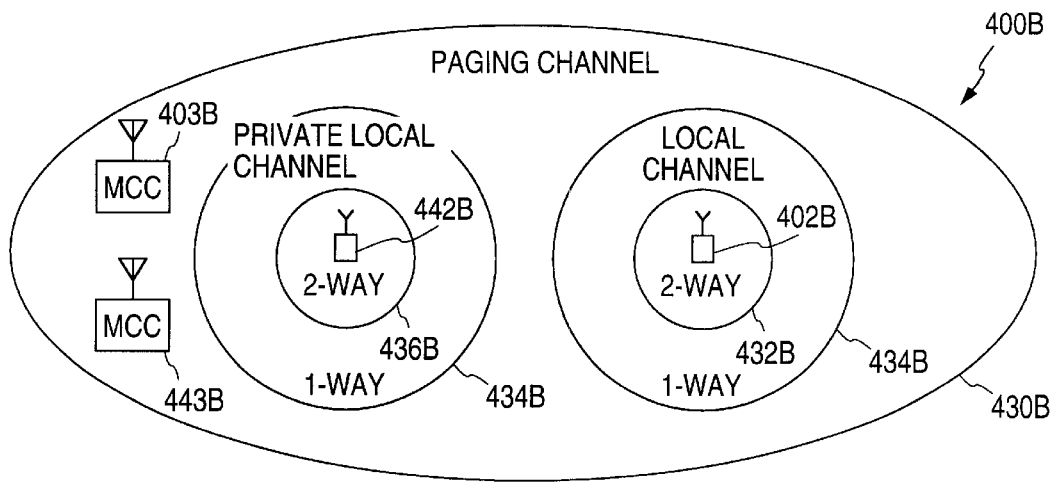
FIG. 4B illustrates, in service area 430B of a wireless data network 400B, private system 436B operating according to an asymmetric area coverage scheme, in accordance with the present invention.

Asymmetric coverage can be provided under CDPA as well. FIG. 4B shows service area 400B in which a private system 434B includes base station 442B. Base station 442B includes (i) uplink range 432B, within which two-way communication between base station 442B and a wireless data terminal can be carried out and, (ii) downlink range 434B, within which a wireless data terminal can receive a message from base station 442B in the local channel.

The difference in power consideration between a wireless data terminal and a base station can also be exploited in an asymmetry in data transmission rates. The format of data packet 200 of FIG. 2 supports such asymmetry. A packet from a wireless data terminal with ASYM control bit 218 in first header 210 set requests asymmetric communication between the wireless data terminal and the base station. Otherwise, i.e., with ASYM control bit 218 reset, the uplink and the downlink data rates are the same (i.e. symmetric), typically at a lower data rate, such as 1200 baud. Alternately, when ASYM control bit 218 is set, the downlink transmits at a higher data rate, such as 9600 baud, while the uplink is at a lower data rate, such as 1200 or 2400 baud. Under asymmetric data rates, a longer uplink distance can be achieved without correspondingly increasing the power requirements of a wireless data terminal.

A message data packet under the CDPA protocol is acknowledged by the recipient's "ACK" packet. The asymmetrical data rates can be used to avoid collision and to extend the range in which an acknowledgment packet can be received. In one implementation of the CDPA protocol, when a message control center fails to receive an ACK packet after several retries through the base stations over a time period of $H_f$ seconds ("retry period") or when the number of attempted retries exceeds a predetermined retry maximum $M_n$ (e.g., three times), the message control center resends the message through the paging channel instead.

In the message data packet, the message control center may set ASYM bit field 218 to suggest the wireless data terminal use variable transmission speeds to transmit the ACK packet responding to the message data packet. In one embodiment, upon receiving the message data packet, a wireless data terminal capable of using variable transmission data rates first attempts the highest speed transmission to send the ACK packet. If the wireless data terminal subsequently receives the same packet, i.e., the previous ACK packet was not received by the message control center, subsequent retries of the ACK packet uses in turn variable data rates, e.g., from low speed to high speed. In one implementation, data rates of 9600 baud and 2400 baud are provided. If ASYM bit field 218 is reset, the wireless data terminal transmits under the symmetric mode. In that case, the wireless data terminal transmits at 9600 bps or 2400 baud according to its programmed baud rate. During the retry period, message control center retransmits the message packet to the base station of the previous attempt, and optionally to one or more nearby base stations based on the latest RSSI information it maintains regarding the recipient wireless data terminal to maximize the probability of successfully transmitting the message data packet to the recipient wireless data terminal. The base station transmits the message data packet from the message control center using data rates the recipient wireless data terminal is capable of receiving.

Figure 5A:
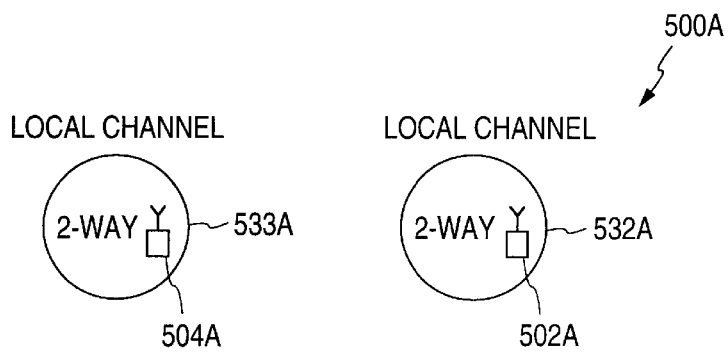
FIG. 5A illustrates a wireless data network 500A, in which a local-only mode of a CDPA protocol of the present invention is implemented.
Figure 5B:
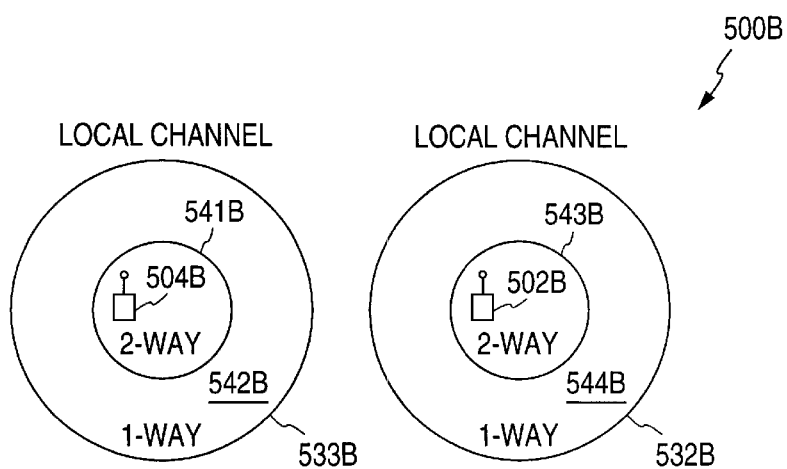
FIG. 5B illustrates a wireless data network 500A, in which a local-only mode of a CDPA protocol of the present invention is implemented in conjunction with an asymmetric area coverage scheme.

A similar variable speed retry scheme is used in the uplink to improve the probability of successful data transmission. A wireless data terminal can be programmed to operate either in the symmetric mode or the asymmetric mode. Under the asymmetric mode, the wireless data terminal uses variable speed retries. Thus, when the wireless data terminal fails to receive an ACK packet from the message control center indicating receipt of its uplink data packet, the wireless data terminal will first retry transmission of the data packet under a high data rate. Subsequently, the wireless data terminal varies the transmission data rate, in cycles of low speed transmission to high speed transmission. The retries are attempted at randomized time intervals, so as to minimize collision with other wireless data terminals competing for the uplink. A wireless data terminal attempts retransmission until a predetermined maximum number of retries $H_n$ (e.g., three times) is exceeded. CDPA can also be operated in a "local-only" mode Under the local-only mode, as illustrated in FIG. 5A, a paging channel is not provided. In FIG. 5A, base stations 504A and 502A of wireless data network 500A provide local service areas 533A and 532A respectively. A wireless data terminal operating in the local-only mode camps on the local channel at all times. Local-only mode can also be implemented with an asymmetric area coverage scheme, as illustrated in FIG. 5B, showing base stations 504B and 502B of wireless data network 500B providing local service areas 533B and 532B respectively. Within local service area 533B is 2-way service area 541B and 1-way service area 542B. Similarly, within local service area 532B is 2-way service area 543B and 1-way service area 544B.

As in the local override mode discussed above, local-only mode is selected by setting LOC bit 231 in first header portion 210 of data packet 200. Registration of the wireless data terminal to the local base station is performed in substantially the same manner as discussed above with respect to local override mode. As in local override mode, any of base stations 504A, 504B, 502A and 502B can be part of a private system. The requirements for these base stations with respect to data packet frequency and beacons are the same as under the local override mode.

In CDPA, although local registration is not required under dual mode operation, local registration can be used under dual mode operation to reduce the wake-up traffic in the paging channel, and to avoid the latency incurred through the paging channel. Registration under dual mode can proceed in the same manner discussed above as with respect to the local override and local-only modes.

When a wireless data terminal is moving rapidly through several cells in a wireless data network, local registration upon entry of each cell is not practical and may slow down packet transmission. Under such as scheme, packet transmission can be severely delayed because a message arriving at a base station to which a wireless data terminal previously registered may need to be forwarded through one or more base stations the wireless data terminal subsequently registered, as the wireless data terminal may have moved out of the service area of each of these base stations when the message arrives at the base station. Thus, under such a scheme, the overhead requirements are high for a message control center of a wireless data network tracking a wireless data terminal which registers with a number of base stations in rapid succession. Further complicating the problem of local registration is the situation when a wireless data terminal moves in and out of the local service areas of two adjacent cells. A pathological case ("oscillation") can develop in which the message control center may consistently deliver the message to a base station immediately after the wireless data terminal has registered with the other base station.

Figure 6:
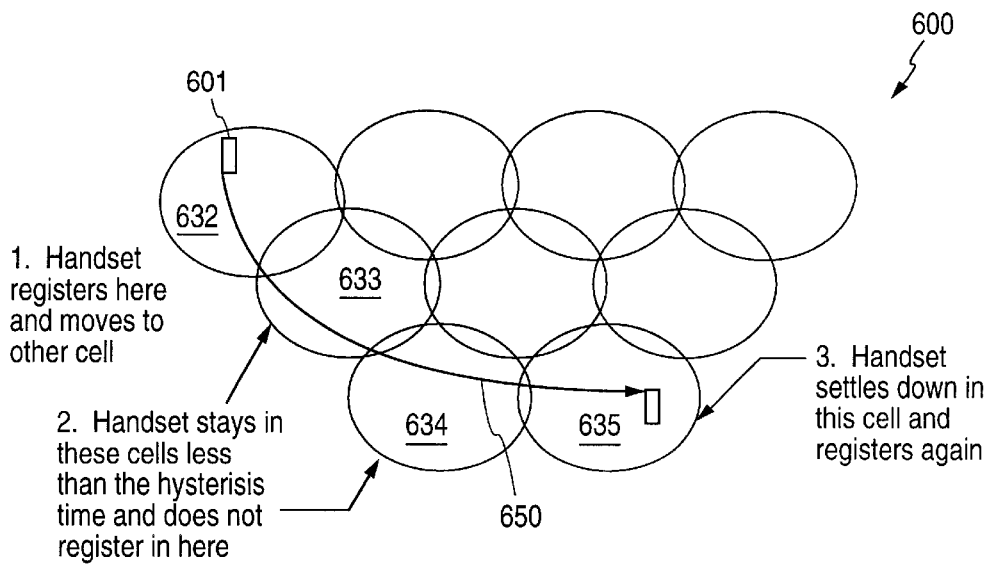
FIG. 6 illustrates the operation of the local registration delay hysteresis time $T_{th}$.

To avoid oscillation and to simplify handling of local registration when a wireless data terminal moves rapidly between base stations, the CDPA protocol prescribes a local registration hysteresis delay time $T_{th}$. Under this scheme, a wireless data terminal leaving the service area of the base station it is registered refrains from registering with a new local base station until the expiration delay $T_{th}$, which is set in one embodiment to be 15 minutes. FIG. 6 illustrates the operation of the local registration hysteresis delay time $T_{th}$ in a wireless data network 600. A wireless data terminal 601, initially registered with base station 632, moves rapidly along a path 650 through cells 632, 633 and 634 to arrive at cell 635, remaining in each of cells 633 and 634 for a time period less than $T_{th}$. Under CDPA, wireless data terminal 601 does not register locally with base stations in cells 633 and 634. After wireless data terminal 601 remains in cell 635 for a time period exceeding $T_{th}$, wireless data terminal 601 requests registration. If a message was delivered to cell 632 after wireless data terminal 601 has left cell 632, the message is held in abeyance by the message control center of the wireless data network 600 until cell 635 reports local registration, or when called for by wireless data terminal 601 under dual mode. Thus, misdelivery to cells 633 and 634 are avoided.

Figure 7:
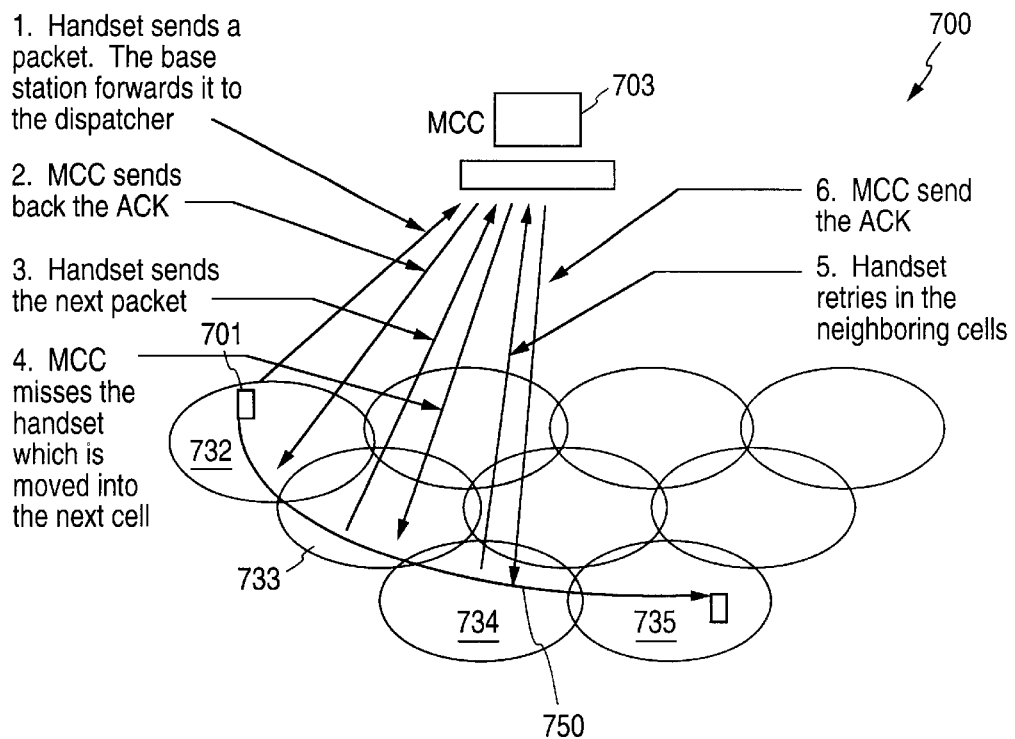
FIG. 7 illustrates a mobility management scheme of the CDPA protocol of the present invention.

The CDPA protocol of the present invention provides a mobility management scheme for a wireless data network, so that a mobile wireless data terminal can continue to send and receive messages in a seamless manner as the wireless data terminal moves through a succession of base stations in the wireless data network. The mobility management scheme of the present invention is illustrated by FIG. 7. As shown in FIG. 7, a wireless data terminal 701, which is initially registered with a base station in cell 732, travels along a path 750 in a wireless data network 700, arriving successively at cells 733, 734 and 735. While in cell 732, wireless data terminal 701 sends a data packet to a base station in cell 732, which is relayed by the base station to message control center 703. Message control center 703 responds by sending an acknowledgment (ACK) packet to wireless data terminal 701 through the base station in cell 732. This ACK packet arrives at a time after wireless data terminal 701 has left cell 732. As wireless data terminal 701 arrives at cell 733, wireless data terminal 701 sends a second data packet. Presuming that wireless data terminal 701 is in cell 733, message control center 703 sends the previously missed ACK packet to the base station in cell 733 for delivery. This ACK packet also misses as wireless data terminal 701 has already moved to cell 734. Because wireless data terminal 701 did not receive the ACK packet from message control center 703 after a predetermined delay, wireless data terminal 701 retries by sending from cell 734 the previously unacknowledged data packet. Again presuming that wireless data terminal 701 is in cell 734, message control center 703 retransmit the twice-missed ACK packet to the base station in cell 734. The ACK packet, in this instance, is received by wireless data terminal 701 in cell 734. In this manner, messages are sent and received by mobile wireless data terminal 701 traveling through a number of cells in succession through wireless data network 700.

To summarize, a wireless data network of the present invention, e.g. wireless data network 400A of FIG. 4A, provides at least the following advantages. First, messages originating and received within a private system (e.g., private system 436A) avoids latency within the public system. Second, because registration is required within the private system, access control (e.g. through encryption keys administered by a private message control center, such as message control center 443A, or through a proprietary addressing scheme) can be provided, so that messages transmitted locally within the private system can remain proprietary or confidential and not accessible by wireless data terminals not registered with the private system. Third, under CDPA, a wireless data terminal moves seamlessly between the private system and the rest of wireless data network. Therefore, a wireless data terminal can maintain message exchange activities even as the wireless data terminal is moving between a private system and a public system. Lastly, utilizing local communication within the private system enhances performance, and reduces usage charge associated with using the public system. The above detailed description are provided to illustrate the specific embodiments of the present invention and is not intended to be limiting. Numerous modifications and variations within the scope of the present invention are possible. The present invention is defined by the appended claims thereto.

What is claimed is:

1. A two-way wireless data network, comprising:
 a plurality of mobile wireless data terminals, each wireless data terminal capable of transmitting a radio signal of a predetermined frequency over a predetermined range at a first transmission rate;
 a base station having a radio signal transceiver, said base station serving a first service area and capable of transmitting a radio signal of a predetermined frequency at a second transmission rate; and
 a message control center coupled to said base station, said message control center being capable of transmitting a radio signal of a predetermined frequency, which is different from said predetermined frequency of said base station, over a second service area encompassing and greater than said first service area;

wherein each of said wireless data terminal monitors said predetermined frequency of said base station for two-way communication when said wireless terminal is located within said first service area and monitors said predetermined frequency of said message control center when said wireless terminal is located outside of said first service area, and said first transmission rate is less than said second transmission rate.

2. The two-way wireless data network of claim 1, wherein said message control center relays messages destined for a first one of said plurality of mobile wireless data terminals to said base station for transmission to said first one of said plurality of mobile wireless data terminals.

3. A two-way wireless data network, comprising:

a plurality of mobile wireless data terminals, each wireless data terminal capable of transmitting a radio signal of a predetermined frequency over a predetermined range at a first transmission rate;

a base station having a radio signal transceiver, said base station serving a first service area, and capable of transmitting a radio signal of a predetermined frequency at a second transmission rate; and a message control center coupled to said base station, said message control center being capable of transmitting a radio signal of a predetermined frequency, which is different from said predetermined frequency of said base station, over a second service area encompassing and greater than said first service area;

wherein each of said wireless data terminal monitors said predetermined frequency of said base station for two-way communication when said wireless terminal is located within said first service area and monitors said predetermined frequency of said message control center when said wireless terminal is located outside of said first service area, and said base station sends a data packet to one of said wireless data terminals, such that when said wireless data terminal receives said data packet, said wireless data terminal acknowledges receipt of said data packet by transmitting an acknowledgment packet at said first transmission rate, which is slower than said second transmission rate.

4. The two-way wireless data network of claim 3, wherein said base station indicates in said data packet to said wireless data terminal use of said first transmission rate in said acknowledgment packet in a field within a header of said data packet.

5. The two-way wireless data network of claim 3, wherein said message control center relays messages destined for a first one of said plurality of mobile wireless data terminals to said base station for transmission to said first one of said plurality of mobile wireless data terminals.

6. In a two-way wireless data network, a method comprising the steps of:

providing a plurality of mobile wireless data terminals, each wireless data terminal capable of transmitting a radio signal of a predetermined frequency over a predetermined range at a first transmission rate;

providing a base station having a radio signal transceiver, said base station serving a first service area and capable of transmitting a radio signal of a predetermined frequency at a second transmission rate; and providing a message control center coupled to said base station, said message control center being capable of transmitting a radio signal of a predetermined frequency, which is different from said predetermined frequency of said base station, over a second service area encompassing and greater than said first service area;

wherein each of said wireless data terminal monitors said predetermined frequency of said base station for two-way communication when said wireless terminal is located within said first service area and monitors said predetermined frequency of said message control center when said wireless terminal is located outside of said first service area, and said providing steps providing first transmission rate to be less than said second transmission rate.

7. The method of claim 6, wherein said message control center relays messages destined for a first one of said plurality of mobile wireless data terminals to said base station for transmission to said first one of said plurality of mobile wireless data terminals.

8. In a two-way wireless data network, a method comprising the steps of:

providing a plurality of mobile wireless data terminals, each wireless data terminal capable of transmitting a radio signal of a predetermined frequency over a predetermined range at a first transmission rate;

providing a base station having a radio signal transceiver, said base station serving a first service area, and capable of transmitting a radio signal of a predetermined frequency at a second transmission rate; and providing a message control center coupled to said base station, said message control center being capable of transmitting a radio signal of a predetermined frequency, which is different from said predetermined frequency of said base station, over a second service area encompassing and greater than said first service area;

wherein each of said wireless data terminal monitors said predetermined frequency of said base station for two-way communication when said wireless terminal is located within said first service area and monitors said predetermined frequency of said message control center when said wireless terminal is located outside of said first service area, and said base station sends a data packet to one of said wireless data terminals, such that when said wireless data terminal receives said data packet, said wireless data terminal acknowledges receipt of said data packet by transmitting an acknowledgment packet at said first transmission rate, which is slower than said second transmission rate.

9. The method of claim 8, wherein said base station indicates in said data packet to said wireless data terminal use of said first transmission rate in said acknowledgment packet in a field within a header of said data packet.

10. The method of claim 8, wherein said message control center relays messages destined for a first one of said plurality of mobile wireless data terminals to said base station for transmission to said first one of said plurality of mobile wireless data terminals.

* * * * *